(12) United States Patent
Bonnamour et al.

(10) Patent No.: US 10,155,419 B2
(45) Date of Patent: Dec. 18, 2018

(54) TREAD COMPRISING A BLOCK HAVING A PLURALITY OF SIPES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Matthieu Bonnamour, Clermont-Ferrand (FR); Benoit Durand-Gasselin, Clermont-Ferrand (FR); Serge Lefebvre, Clermont-Ferrand (FR); Mathieu Vandaele, Clermont-Ferrand (FR); Kazutaka Yokokawa, Clermont-Ferrand (FR); Masayoshi Nomura, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 0 days.

(21) Appl. No.: 15/034,734

(22) PCT Filed: Nov. 5, 2014

(86) PCT No.: PCT/EP2014/073791
§ 371 (c)(1),
(2) Date: May 5, 2016

(87) PCT Pub. No.: WO2015/067644
PCT Pub. Date: May 14, 2015

(65) Prior Publication Data
US 2016/0263946 A1    Sep. 15, 2016

(30) Foreign Application Priority Data

Nov. 5, 2013    (FR) .................................... 13 60824

(51) Int. Cl.
*B60C 11/12*    (2006.01)
*B60C 11/03*    (2006.01)
*B60C 11/04*    (2006.01)

(52) U.S. Cl.
CPC ...... *B60C 11/1236* (2013.01); *B60C 11/0332* (2013.01); *B60C 11/1204* (2013.01);
(Continued)

(58) Field of Classification Search
CPC ............. B60C 11/1281; B60C 11/1204; B60C 2011/1209; B60C 11/04; B60C 11/1213
See application file for complete search history.

(56) References Cited

U.S. PATENT DOCUMENTS 2,821,231 A    1/1958 Kraft
4,230,512 A *  10/1980 Makino ............... B60C 11/0306
                                                      152/209.21
(Continued)

FOREIGN PATENT DOCUMENTS

EP    0369932 A    5/1990
FR    759592       2/1934
(Continued)

OTHER PUBLICATIONS

French Search Report, dated May 30, 2014 issued in corresponding French Patent Application No. 1360824.

*Primary Examiner* — Jodi C Franklin
(74) *Attorney, Agent, or Firm* — Dickinson Wright PLLC

(57) ABSTRACT

Disclosed herein is a tread for a tire. The tread includes at least one elongate block of rubbery material of width W and length L with L>>W. This elongate block extends in a circumferential direction (X) when the tread is mounted on (Continued)

the tire. The elongate block includes a contact surface intended to come into contact with the ground and a first lateral wall and a second lateral wall delimiting this contact surface. The elongate block includes a plurality of sipes opening onto the contact surface of the elongate block, with each sine extending in an oblique direction opening onto the first lateral wall and onto the second lateral wall. The sipes are distributed over the contact surface of the block in such a way that when one sipe reaches the second lateral wall another sipe starts out from the first lateral wall, at a same circumferential level (N) on the elongate block. With the sipes delimiting sub-blocks in the elongate block, at least two of these sub-blocks are configured differently in the tread.

11 Claims, 2 Drawing Sheets

(52) U.S. Cl.
CPC ....... *B60C 11/04* (2013.01); *B60C 2011/0334* (2013.01); *B60C 2011/0386* (2013.01); *B60C 2011/1209* (2013.01); *B60C 2011/1227* (2013.01); *B60C 2011/1295* (2013.01)

(56) References Cited

U.S. PATENT DOCUMENTS

| | | | | |
|---|---|---|---|---|
| 4,926,919 A * | 5/1990 | Hopkins | ............. | B60C 11/0306 152/209.22 |
| 5,924,464 A | 7/1999 | White | | |
| 6,968,881 B2 * | 11/2005 | Ratliff, Jr. | ........... | B60C 11/0302 152/209.15 |
| 9,764,596 B2 * | 9/2017 | Sanae | ................. | B60C 11/1204 |
| 2004/0256040 A1 * | 12/2004 | Ratliff, Jr. | ........... | B60C 11/0306 152/209.18 |
| 2007/0151646 A1 * | 7/2007 | Ito | ...................... | B60C 11/0306 152/209.25 |
| 2009/0090444 A1 | 4/2009 | Feider et al. | | |
| 2009/0114325 A1 * | 5/2009 | Ishizaka | ................ | B60C 9/2006 152/209.26 |
| 2009/0283188 A1 * | 11/2009 | Itoh | ..................... | B60C 11/0309 152/209.18 |
| 2010/0154951 A1 * | 6/2010 | Honbou | ............. | B60C 11/0306 152/209.18 |
| 2010/0218867 A1 * | 9/2010 | Matsumoto | ............. | B60C 11/12 152/209.18 |
| 2011/0005652 A1 * | 1/2011 | Ono | .................... | B60C 11/0309 152/209.18 |
| 2012/0168049 A1 * | 7/2012 | Jenkins | ................... | B60C 11/12 152/209.21 |
| 2013/0014870 A1 * | 1/2013 | Georges | ................. | B60C 11/12 152/209.18 |
| 2013/0014871 A1 * | 1/2013 | Georges | ................. | B60C 11/04 152/209.18 |
| 2013/0061992 A1 * | 3/2013 | Mathonet | ................ | B60C 11/04 152/209.18 |
| 2013/0098519 A1 * | 4/2013 | Maehara | ............. | B60C 11/0306 152/209.22 |
| 2013/0139937 A1 * | 6/2013 | Gayton | ............... | B60C 11/0306 152/209.18 |
| 2013/0167998 A1 * | 7/2013 | Kato | ..................... | B60C 11/032 152/209.18 |
| 2013/0284335 A1 * | 10/2013 | Rolland | .................. | B60C 11/03 152/209.25 |
| 2014/0014245 A1 * | 1/2014 | Bonhomme | ............ | B60C 11/04 152/209.18 |
| 2014/0053962 A1 * | 2/2014 | Lhospitalier | ........ | B60C 11/0306 152/209.18 |
| 2014/0290820 A1 * | 10/2014 | Hatanaka | .................. | B60C 3/04 152/454 |
| 2014/0305563 A1 * | 10/2014 | Kujime | ............... | B60C 11/1204 152/209.18 |
| 2014/0305564 A1 * | 10/2014 | Sueno | ................. | B60C 11/0306 152/209.18 |
| 2014/0326381 A1 * | 11/2014 | Hamanaka | ............ | B60C 9/2006 152/209.18 |
| 2015/0151588 A1 * | 6/2015 | Munezawa | ............. | B60C 11/04 152/209.25 |
| 2015/0210121 A1 * | 7/2015 | Sanae | ................. | B60C 11/1204 152/209.8 |
| 2015/0352903 A1 * | 12/2015 | Ookawa | ............. | B60C 11/0306 152/209.18 |
| 2015/0360516 A1 * | 12/2015 | Mori | ..................... | B60C 9/2006 152/535 |
| 2016/0082779 A1 * | 3/2016 | Maehara | ............. | B60C 11/0309 152/209.27 |

FOREIGN PATENT DOCUMENTS

FR               43383        5/1934
WO     WO 2014185121 A1 * 11/2014

\* cited by examiner

TREAD COMPRISING A BLOCK HAVING A PLURALITY OF SIPES

This application is a 371 national phase entry of PCT/EP/2014/073791, filed 5 Nov. 2014, which claims the benefit of French Patent Application No. 1360824, filed 5 Nov. 2013, the contents of which are incorporated herein by reference for all purposes.

BACKGROUND

The present disclosure relates to a tread of a tire for a motor vehicle comprising a block of rubbery material, the length of which is very much greater than its width, and more particularly the invention relates to a tread comprising a block having a plurality of sipes.

Document FR759592 discloses the use of sipes in a tire tread for increasing the grip of this tire. Specifically, the use of sipes makes it possible to increase the number of edge corners on the tread surface of the tread thereby notably encouraging grip on wet ground. A sipe means a cut in the tread delimiting walls of material, the width of this cut being suitable for allowing these walls of material to come at least partially into contact as they enter the contact patch in which the tire is in contact with the ground. The width of a sipe is thus at most equal to 2 millimeters (mm).

Document FR43383 which is in addition to document FR759592 discloses the use of oblique sipes. The oblique sipes delimit sub-blocks of rubbery material. Now, the resistance of these sub-blocks to wear varies according to the width of these sub-blocks, that is to say according to the distance between two adjacent oblique sipes. Furthermore, the use of oblique sipes in the tread may lead to additional running noise.

There is therefore a need to offer a tread which, over all or part of this tread, has a plurality of oblique sipes that are distributed in such a way as to optimize the resistance of this tread to wear while at the same time limiting the risks of generating running noise.

A "tire" means all types of resilient tread whether or not it is subjected to an internal pressure.

The "tread" of a tire means a quantity of rubbery material delimited by lateral surfaces and by two main surfaces, one of which is intended to come into contact with a roadway when the tire is running.

A tread "block" means a raised element delimited by grooves and comprising lateral walls and a contact face, the latter being intended to come into contact with the ground during running.

A "groove" means a cut in the tread delimiting walls of material, the width of this cut being such that the walls associated with this cut cannot come into contact with one another under normal running conditions. The width of a groove is greater than 2 millimeters.

A "sipe" means a cut in the tread delimiting walls of material, the width of this cut being suited to allowing the walls of the sipe to come at least partially into contact as they pass through the contact patch in which the tire is in contact with the ground. The width of a sipe is less than or equal to 2 millimeters.

An "axial direction" means a direction parallel to the axis of rotation of the tire.

A "circumferential direction" means a direction tangential to any circle centred on the axis of rotation. This direction is perpendicular to the axial direction.

An "oblique direction" means a direction that has an axial component and a circumferential component neither of which is zero.

SUMMARY

The invention relates to a tread for a tire comprising at least one elongate block of rubbery material of width W and length L with L>>W. This elongate block extends in a circumferential direction when the tread is mounted on the tire. This elongate block comprises a contact surface intended to come into contact with the ground and a first lateral wall and a second lateral wall delimiting this contact surface. Furthermore, the elongate block comprises a plurality of sipes opening onto the contact surface of the elongate block, each sipe extending in an oblique direction opening onto the first lateral wall and onto the second lateral wall. The sipes are distributed over the contact surface of the elongate block in such a way that when one sipe reaches the second lateral wall another sipe starts out from the first lateral wall, at a same circumferential level on the elongate block. Furthermore, with the sipes delimiting sub-blocks in the elongate block, at least two of these sub-blocks are configured differently in the tread.

The invention thus proposes to maintain a certain distance between two adjacent sipes, so that the size of the sub-block delimited by these two sipes is great enough to give it good rigidity. This then limits the risks of the sub-blocks chunking during running.

The invention also proposes organizing the sipes in such a way that when the sipes are projected in a circumferential direction, these sipes have a limited overlap. Each sipe here contributes to the grip performance of the tire notably when braking under cornering on wet ground. If oblique sipes overlap in the circumferential direction, the braking load would be reacted by these two sipes in their region of overlap. The wear of the sub-blocks associated with these two sipes is therefore altered in this region of overlap because the braking load is spread between these two sub-blocks. By contrast, in regions where there is no overlap, one single oblique sipe reacts all of these loads. The wear of each sub-block therefore varies according to whether or not the associated oblique sipes overlap other oblique sipes. By planning to limit the overlapping of the oblique sipes it is possible to ensure that the sub-block wear within the elongate block is uniform overall. This then improves the durability of the tire.

Finally, because the sub-blocks have different dimensions in the tread, the scrambling of the noise signal emitted by the tread pattern of the tire is thus improved and the noticeable features of the tread pattern noise spectrum are thus decreased.

In one alternative form of embodiment, the sipes are rectilinear on the contact surface of the elongate block and each sipe makes an angle $\alpha$ with a transverse direction. At least two sipes of the elongate block have different values of angle $\alpha$.

Sub-blocks of different dimensions are thus formed in a simple and practical way, this being done by a suitable choice of the angle $\alpha$ for each sipe.

In another alternative form of embodiment, the sipes are curved on the contact surface of the elongate block, each sipe having a curvature C. At least two sipes of the elongate block have different values of angle $\alpha$.

By using sipes of curvature C the overall appearance of the tread is made more attractive while at the same time limiting the noise generated by the tire.

In another alternative form of embodiment, the sipes are partially or frilly chamfered on the contact surface of the block.

This then improves tire performance under braking on dry ground.

BRIEF DESCRIPTION OF THE DRAWINGS

Other features and advantages of the invention will become apparent from the following description, given by way of nonlimiting example, with reference to the attached drawings in which.

DETAILED DESCRIPTION

In the description which follows, elements which are substantially identical or similar will be denoted by identical references.

Figure 1:
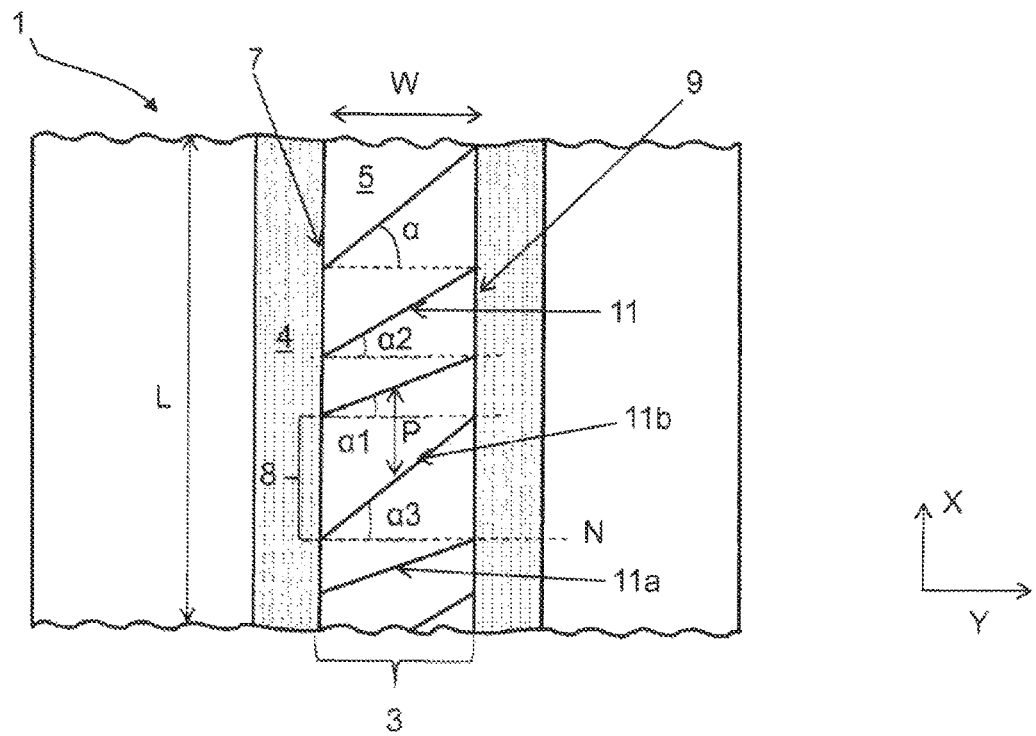
FIG. 1 schematically depicts a partial view of a tread according to a first embodiment.

FIG. 1 is a partial view of a tread 1 of a tire according to a first embodiment of the invention.

The tread 1 comprises at least one elongate block 3 of rubbery material. The elongate block 3 here is delimited by two grooves 4 which have been shaded grey in FIG. 1 in order to make the invention easier to understand. The elongate block 3 has a width W and a length L, this length L being very much greater than the width W. By very much greater it is meant that the length L is at least equal to 5 times the width W. In this way, when the tread 1 is mounted on a tire, the elongate block 3 looks like a strip extending in a circumferential direction X. This strip may extend all around the circumference of the tire. As an alternative, this strip extends over only part of this circumference.

In addition, the elongate block 3 comprises a contact surface 5 intended to come into contact with the ground and a first lateral wall 7 and a second lateral wall 9 delimiting this contact surface 5. Furthermore, the elongate block 3 comprises a plurality of sipes 11, 11a, 11b opening onto the contact surface 5. Each sipe extends in an oblique direction opening onto the first lateral wall 7 and onto the second lateral wall 9. The sipes of the elongate block are, in this instance, oriented in the same direction overall, namely the sipes extend from the first lateral wall 7 towards the second lateral wall 9 in a direction that is positive in X and in Y. These sipes are distributed over the contact surface 5 of the elongate block 3 in such a way that when one sipe 11a reaches the second lateral wall 9, another sipe 11b starts out from the first lateral wall 7, at the same level N on the elongate block 3. What is meant by "at the same level N" on the elongate block 3 is a determined circumferential position on this elongate block. Thus, the circumferential position reached by the sipe 11a on the second lateral wall 9 is the same as the circumferential position reached by the sipe 11b on the first lateral wall 7. Furthermore, "at the same level" means that there may be a slight offset between the circumferential position of the sipes 11a, 11b. This offset is, however, limited. It is preferably less than 5% of the pitch P of the sub-block 8 delimited by the two sipes 11a and 11b. In order to assess whether or not such an offset is present, use is made of the idea of a neutral axis associated with each sipe.

More particularly, in the embodiment of FIG. 1, the sipes are rectilinear on the contact surface of the elongate block. Each sipe makes an angle α with the circumferential direction Y. This angle α varies in the circumferential direction X of the tire. This angle here adopts three values α1, α2, α3 with α1<α2<α3, these values α1, α2, α3 being comprised between 20° and 70°.

It will be noted that the shape of the sub-blocks 8 in this instance is trapezoidal overall with two parallel sides and two non-parallel sides. Each sub-block has a pitch P corresponding to a determined mean distance between the two non-parallel sides of the sub-block 8. Because the values of the angle α vary along the circumference of the tire, at least two of the sub-blocks 8 have, in FIG. 1, different values of pitch P and therefore different configurations.

Figure 2:
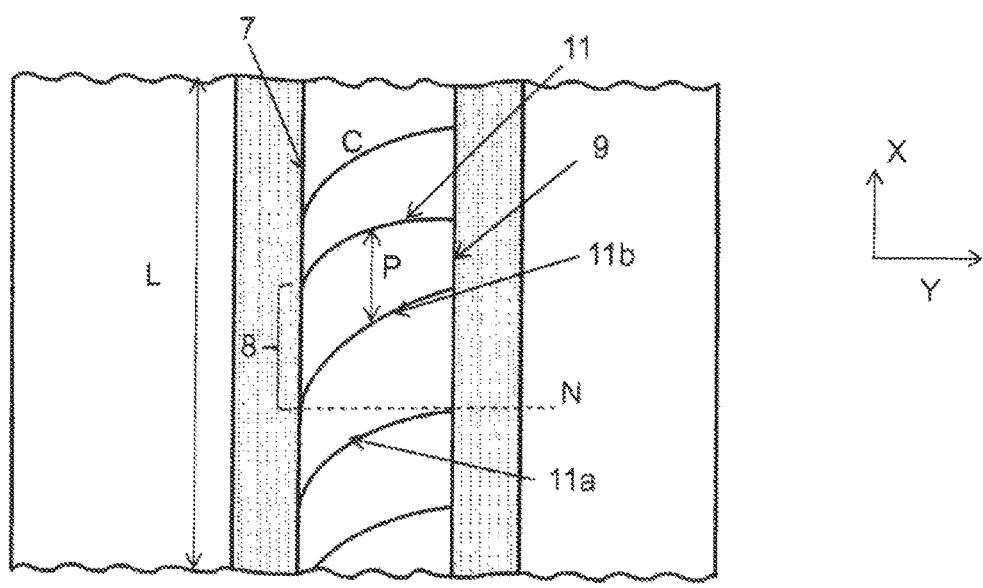
FIG. 2 schematically depicts a second embodiment.

FIG. 2 shows another alternative form of embodiment in which the sipes 11 open onto the contact surface 5 of the elongate block 3 forming curved lines of curvature C.

Just as in the embodiment in FIG. 1, the sipes 11 are distributed over the contact surface 5 of the elongate block 3 so that when one sipe 11a reaches the second lateral wall 9, another sipe 11b starts out from the first lateral wall 7, at the same level N on the elongate block 3. Each sub-block 8 also has a pitch P, this pitch P corresponding to a determined mean distance between the two sipes delimiting this sub-block.

It will be noted here that the curvature C varies in the circumferential direction X of the tire. Because of this variation in curvature, at least two of the sub-blocks 8 have different values of P and therefore different configurations.

Figure 3:
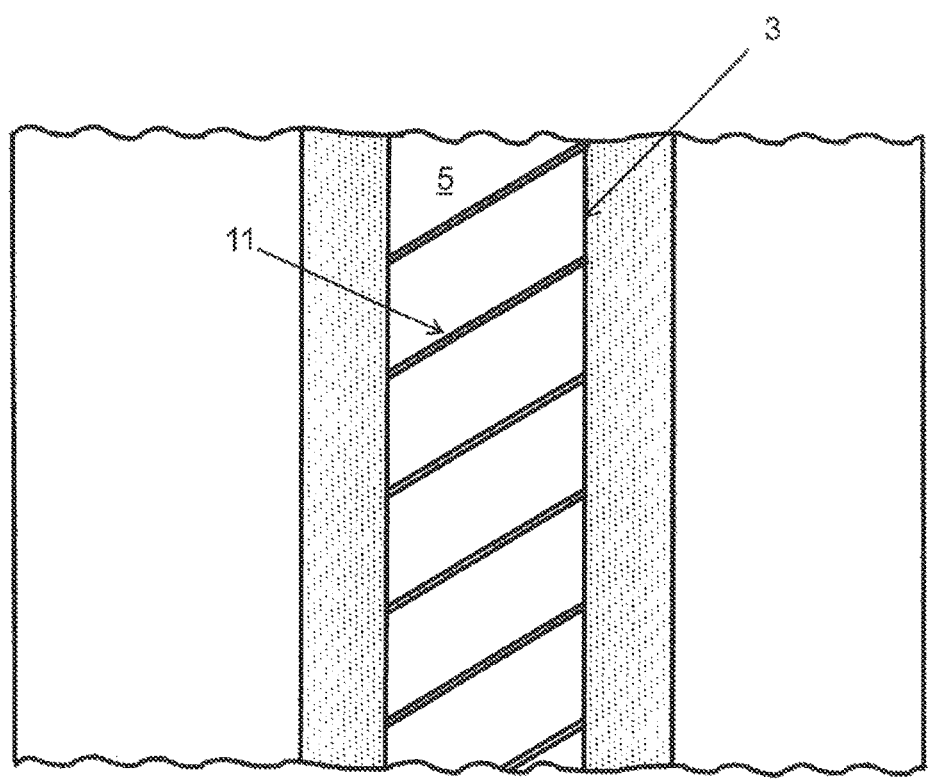
FIG. 3 schematically depicts a third embodiment.

FIG. 3 shows another embodiment in which the sipes 11 are, furthermore, partially or completely chamfered on the contact surface 5 of the elongate block 3.

The aspects disclosed herein are not restricted to the examples described and depicted and various modifications can be made thereto without departing from its scope.

Thus, in the embodiment of FIG. 2, it is possible to plan for the sipes 11 to comprise several parts, each sipe part having a curvature which may differ from the curvatures of the other part or parts of the sipe.

The invention claimed is:

1. Tread for a tire, comprising:
    at least one elongate block of rubbery material of width W and length L with L>>W,
        the at least one elongate block extending in a circumferential direction (X) when the tread is mounted on the tire,
        the at least one elongate block comprising:
            a contact surface in contact with the ground, and
            a first lateral wall and a second lateral wall delimiting the contact surface, the at least one elongate block comprising:
        a plurality of sipes opening on the contact surface of the at least one elongate block, with each of the plurality of sipes extending in an oblique direction opening onto the first lateral wall and on the second lateral wall,
        wherein the plurality of sipes are distributed over the contact surface of the block in such a way that when one of the plurality of sipes reaches the second lateral wall another of the plurality of sipes starts out from the first lateral wall at a same circumferential level (N) on the at least one elongate block,
        the plurality of sipes delimiting sub-blocks in the at least one elongate block, at least two of these sub-blocks are configured differently in the tread, and
        wherein each of the plurality of sipes makes an angle α with a direction (Y) transverse to the circumferential direction of the tire and adjacent sipes extend at angles $\alpha_1$, $\alpha_2$, and $\alpha_3$ respectively and wherein $\alpha_1$ has a lower value than $\alpha_2$ and $\alpha_2$ has a lower value than $\alpha_3$.

2. The tread according to claim 1, wherein the plurality of sipes are rectilinear on the contact surface of the at least one elongate block.

3. The tread according to claim 2, wherein the sub-blocks define a trapezoidal shape.

4. The tread according to claim 3, wherein at least two adjacent sub-blocks is configured differently.

5. The tread according to claim 1, wherein the plurality of sipes are curved on the contact surface of the at least one elongate block, with each of the plurality of sipes having a curvature C, so that at least two sipes of the at least one elongate block have different values of curvature C.

6. The tread according to claim 1, wherein the plurality of sipes are partially or fully chamfered on the contact surface of the at least one elongate block.

7. The tread according to claim 6, wherein the plurality of sipes are fully chamfered.

8. The tread according to claim 1, wherein each of the plurality of sipes extend at an oblique angle from the first lateral wall to the second lateral wall.

9. The tread according to claim 8, wherein the plurality of sipes are distributed over the contact surface of the block in such a way that when one of the plurality of sipes reaches the second lateral wall, and an adjacent one of the plurality of sipes starts out from the first lateral wall at a same circumferential level (N) on the at least one elongate block.

10. The tread according to claim 1, wherein the plurality of sipes are distributed over the contact surface of the block in such a way that when one of the plurality of sipes reaches the second lateral wall, and an adjacent one of the plurality of sipes starts out from the first lateral wall at a same circumferential level (N) on the at least one elongate block.

11. The tread according to claim 1, wherein the angles $\alpha_1$, $\alpha_2$, and $\alpha_3$ extend between 20° and 70°.

* * * * *